United States Patent [19]

Engdahl et al.

[11] Patent Number: 4,510,602
[45] Date of Patent: Apr. 9, 1985

[54] PROGRAMMABLE LOGIC APPARATUS FOR ENTERING, PROCESSING AND TRANSMITTING DATA

[75] Inventors: Jean Engdahl; Jérôme Formaz, both of Bienne, Switzerland

[73] Assignee: Fordahl S.A.R.L., Bienne, Switzerland

[21] Appl. No.: 386,798

[22] Filed: Jun. 9, 1982

[30] Foreign Application Priority Data

Jun. 24, 1981 [FR] France .................................. 81 12908

[51] Int. Cl.³ .............................................. G11C 13/00
[52] U.S. Cl. ...................................... 371/21; 365/189
[58] Field of Search ........................... 371/21; 365/189

[56] References Cited
U.S. PATENT DOCUMENTS 4,380,805 4/1983 Proebsting ............................ 371/21

*Primary Examiner*—Terrell W. Fears
*Attorney, Agent, or Firm*—George E. Kersey

[57] ABSTRACT

Logic apparatus for presenting results or commanding actions on the basis of furnished informtion. The apparatus includes three distinctive memories which are interrogated cyclically and in synchronism. The first distinctive memory contains instructions, while the second memory contains masking grid signals. The third memory contains pairs of input and output addresses. A logic comparator determines if a prerequisite condition is satisfied and distinctive channels or buses are used for intercommunication. A first bus applies inputs to the comparator, a register or an output unit; a second bus applies grid signals to the comparator, a register, or an output; and a third bus sends addresses to input and output units.

10 Claims, 1 Drawing Figure

PROGRAMMABLE LOGIC APPARATUS FOR ENTERING, PROCESSING AND TRANSMITTING DATA

BACKGROUND OF THE INVENTION

The present invention relates to electronic apparatus for presenting results or initiating actions on the basis of certain kinds of information involving, for example, large numbers of entries, modes of desired treatment, and the like.

The invention applies, in particular, to the following illustrative cases:

To analog systems in which the reading or magnitude of interest can have a variety of values over a specified range, for example, in the case of a volt meter;

To logic arrangements in which the presence or absence of values possessed by inputs produces one or a plurality of outputs, resulting in logic operations such as AND or OR; arithmetic or numeric operations; or real time operations in, for example, sequential systems;

To systems making use of logic elements, including software, that can be programmable or modifiable and often employ a microprocessor;

To a computer.

The first two applications mentioned above are specialized in the sense of having a single realization for a variety of situations.

The last two applications, by contrast, have a multiple usage, which results from program modification.

An apparatus that has a multiplicity of employments is of particular value because in can be used in a number of different ways with a limited number of components.

Unfortunately, two major difficulties are presented by equipment which makes use of programming:

Systems which employ a microprocessor require for each new employment a programming effort that requires highly qualified personnel;

Computers make use of highly sophisticated languages in order to achieve rapid programming which does not require any knowledge of the internal computer structure. As a result the cost of programming is appreciable and not always justifiable for a particular application.

Accordingly, it is an object of the present invention to realize programmable logic apparatus taking into account data, instructions, inputs and outputs using apparatus that is easily programmed and eliminates many of the foregoing inconveniences. A related object is to achieve simple modification for different usages of the apparatus, using simple instructions that are easily learned by personnel with little knowledge of computer jargon.

Another object of the invention is to realize apparatus in which inputs and outputs are easily supplemented. A related object is to provide for more rapid augmentation of inputs and outputs than can be realized with conventional sequential programming of microprocessors and computers. Another related object is to achieve multiple treatments of information without interference among the informational constituents.

SUMMARY OF THE INVENTION

In accomplishing the foregoing and related objects the invention provides programmable logic apparatus containing three distinctive memories, respectively storing instruction, grid signals, and pairs of addresses. The grid signals permit all or a portion of an instruction to be taken into account in the processing procedure. The pairs of addresses define inputs or outputs. A logic comparator included within the apparatus is used to determine if a condition is satisfied for permitting a prescribed course of action to proceed. The memories containing the instructions, grid signals and pairs of addresses are interrogated cyclically and in synchronism.

In accordance with one aspect of the invention, a first channel of intercommunication, or bus, is used to apply an input to the comparator, a register, or an output unit, or alternatively is used to apply an instruction to the register or the output unit. A second channel or bus is used to apply the grid signals to the comparator, to the register, or to the output unit. A third channel or bus is used in transmitting the pairs of addresses from the associated memory to the inputs and output units.

In accordance with another aspect of the invention, the comparator activates an equality indicator if a succession of comparisons satisfies a logic equation of AND and OR operations presented in the form of a sum of products or a product of sums. The indicator determines if a given instruction provides a valid input.

In accordance with a further aspect of the invention, a plurality of peripheral decentralized units are provided for arithmetic operations, comparisons, and counting operations without interfering with or delaying the execution of a principal program stored in the memories.

In accordance with a still further aspect of the invention, the cyclic interrogation of the memories is over a limited address region extending between an initial address and a final address. This procedure frees the remaining portions of the memories for secondary and diagnostic programs.

In accordance with yet another aspect of the invention, a logic unit is provided for the presentation of conditions in pneumonic form and translation into program instructions for the memories.

DESCRIPTION OF THE DRAWING

Other aspects of the invention will become apparent after considering the following detailed description, with reference to the drawing in which.

DETAILED DESCRIPTION

Figure 1:
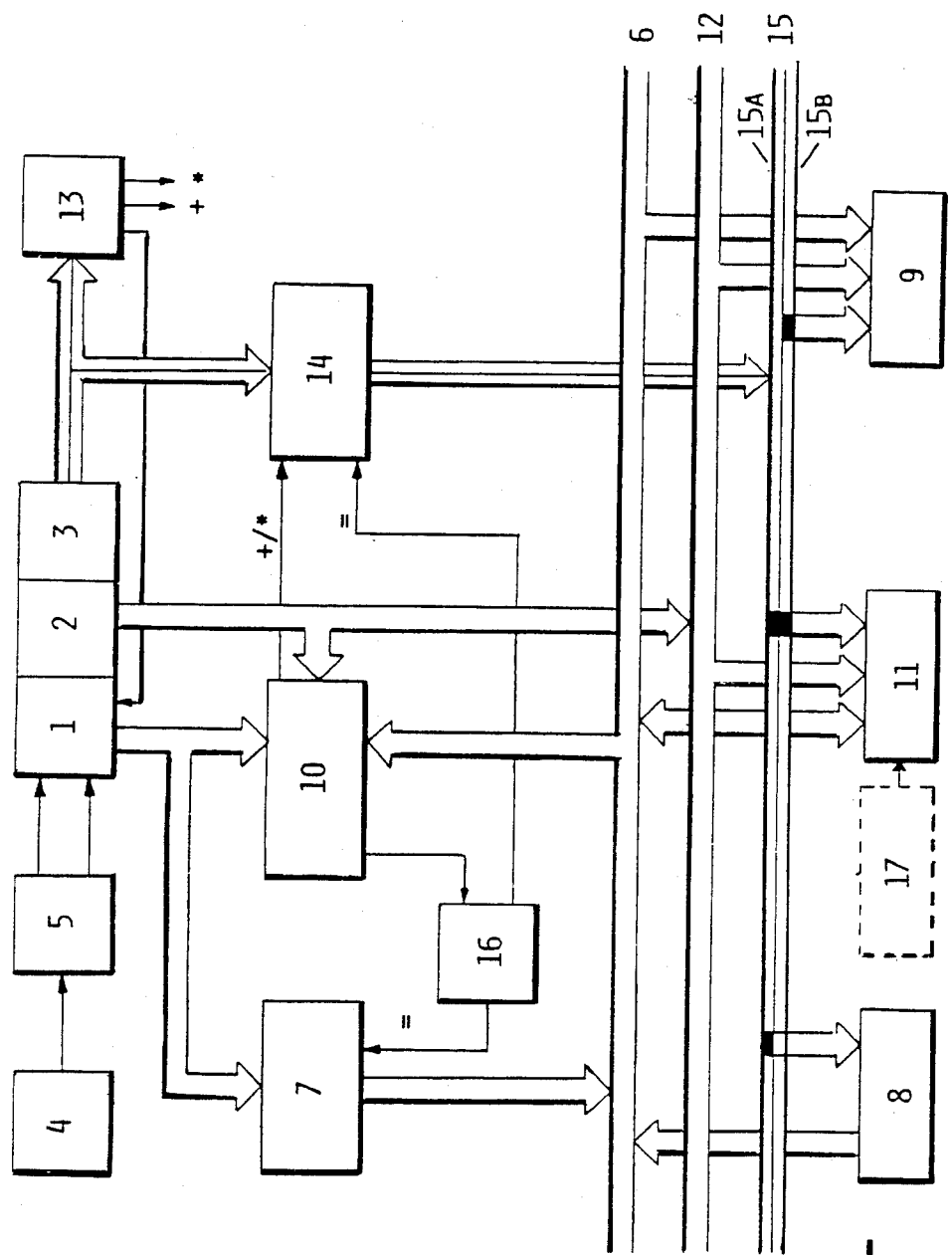
FIG. 1 is a schematic representation of apparatus for practicing the invention.

With reference to the drawing, FIG. 1 shows three memories, or groups of memories, 1, 2 and 3, respectively containing instructions, grid signals forming grid "words" and pairs of addresses. Each of the memories 1, 2 or 3 contains the same number of individual storage locations known as storage or memory "words". Each storage position, i.e. word, includes a prescribed number of bit signal positions, each of which is known as a "bit". Generally, each word includes four, eight or sixteen bits, depending upon the particular circuit under consideration. It will be understood that the number of bits in a word can be adjusted according to circumstances. Each word in the memories 1, 2 and 3 is registered according to its order number, which is known as the "memory address".

A generator 4 of cyclic addresses is used to interrogate the memories 1, 2 and 3 in sequence from the first designated address position to the last designated address position. Addressing takes place at a rapid rate and is recommenced periodically. The memories 1, 2 and 3 are connected in parallel so that each address is common for each of the three memories.

A limiter circuit 5 constrains the addressing sequence to a prescribed zone, for example, the zone encompassed by memory addresses ranging from location number 142 to location number 1017. It will be appreciated that the indicated address zone is merely for illustration and can be varied according to need. The zone limitation feature permits the storage of several programs in the same, corresponding sections of the memories. In addition to the memory and addressing circuitry 1, 2, 3, 4 and 5, the system includes three channels, or buses, for intercommunication between and among the memory structure and other elements of the system described below. Each of the buses, 6, 12, or 15, includes a group of lines in accordance with the number of bits in the words extracted from the memory and circulated in the system. As a result, there are three groups 6, 12 and 15 of lines connected among system elements.

The bus 6 is used for data and is branched to the instruction memory 1 by a gate 7. The data bus also extends to an input unit 8, an output unit 9, and a comparator 10, as well as to registers 11, and other peripherals 17 as explained below.

The bus 12 is is used for the transmission of grid signals and is connected directly to the grid memory 2.

The address memory 3 is connected to an internal decoder 13, as well as to a gate 14 through which addresses are applied to the bus 15 which is therefore known as the address bus. As indicated in FIG. 1, the decoder output includes three control lines of which one line acts upon the instruction memory 1 and the other two lines indicate specific logic operations, namely "+" for OR and "*" for AND.

The comparator 10 permits a determination at a specified instant, if an instruction word read from the memory 1 corresponds to a data word on the data bus 6, the latter having been applied to the data bus 6 by way of the input unit 8, a register 11, or some other peripheral unit.

Correspondence is determined by a special comparison indicator 16 which provides a marker signal on two output lines that extend respectively to the gate 7 and the gate 14. The indicator 16 is able, in effect, to elevate or lower a marker i.e. flag of equality, according to the functioning of the comparator 10.

In general it is to be noted in FIG. 1 that each signalling channel with a single line for signals is indicated by a single line with a solid arrowhead. Conversely, each channel which includes multiple signalling lines is indicated by a band which terminates in a hollow arrowhead. In the case of the address memory 3 which transmits a pair of addresses for each address operation, the output channel is divided into two halves which the boundary between the halves extending to the tip of the associated hollow arrow. Finally, on the address bus 15 which receives the pairs of addresses, the addresses for the input unit 8 are found on the upper portion of the channel as indicated by the black rectangle at the intersection of the channel extending to the input unit 8 from the address bus 15. Similarly, the addresses for the output unit 9 are on the lower portion of the address channel 15, while either an output or an input address can be dispatched to the register 11 and a black square at the intersection of the address bus 15 and the output channel is used to indicate this function. Where the channels have double headed arrows, as in the case of the left hand channel extending from the register 11 to the data bus 6, the transfer of information can take place in either direction.

The functioning of the programmable logic assemblage of FIG. 1 can be illustrated by a non-limiting example in which each of the memories 1, 2 and 3 is able to store 2,048 words of eight bits each. As a result, in this example, each bus 6, 12, and 15 includes eight lines, one for each bit. In this example it is assumed that the comparator 10 is operated to elevate the flag or mark of equality and as a result give a comparison which is "true" when a prescribed condition is is satisfied (OR mode) or lower the flag of equality when a comparison indicates an inequality (AND mode).

In the configuration being described, the comparator 10 activates the indicator 16 and gives a positive response (true) when a sum of logic elements is satisfied. It will be appreciated that the result of sums may be considered but the main situation is in accordance with the example under consideration.

When the flag of equality is elevated, the indicator 16 produces output signals which open the gates 7 and 14. When the gate 14 is opened, a pair of addresses 15A and 15B are received from the address memory 3 on the address bus 15. One of the addresses 15A designates a source of information: The input unit 8, a register 11, the instruction memory 1, or some other source associated with the data bus 6. The other address 15B designates a destination: The output unit 9, a register 11, the comparator 10, or some other destination.

The grid memory 2 applies signals to the grid bus 12. The principal role of the grid signals is to provide a masking effect with respect to certain word bits. The grid signals are also used with inputs and outputs, for bit modification and for decision making. In the case of inputs, the grid signals operate by way of the comparator 10 which is used in determining if a particular condition is satisfied. This functioning is illustrated by the following example.

| MEMORY: Bit No. | 1 | 2 | 3 | 4 | 5 | 6 | 7 | 8 |
|---|---|---|---|---|---|---|---|---|
| -instruction | 1 | 1 | 0 | 0 | 0 | 1 | 0 | 0 |
| -grid | 1 | 1 | 1 | 0 | 0 | 1 | 0 | 0 |
| -Input (data bus) | 1 | 1 | 0 | 1 | 0 | 1 | 1 | 0 |
| Result: | $\bar{1}$ | $\bar{1}$ | 0 | $\bar{X}$ | $\bar{X}$ | $\bar{1}$ | $\bar{X}$ | $\bar{X}$ |
| X is 1 or 0 | | | | | | | | |

The grid having a value of "0" for the bits 4-5-7 and 8, signifying that the condition is admitted as realized if the data bits for which the grid has a value of "1" corresponds to the instruction contained in the memory 1.

One such case is encountered in the command of the machine if operation of a STOP button captures the state of other entry information. There is an instruction 10000000 and a grid 10000000 for which the first bit signifies that the STOP button is activated and the following instruction places all the outputs unconditionally at zero to interrupt the processing sequence.

The entry units 8 are able to be a group of command elements, for example, buttons at the disposition of the operator, proper elements of the machine or process: contacts at the end of a procedure, various headings, indicators of physical properties (speed, temperature, tension, etc.) and given data in numerical form (from coders, a keyboard, a peripheral with a digital output, etc.)

In the preceding example, a numerical entry is able to have two decimal ciphers, for which 8 bits permit transmission in binary coded decimal form (BCD).

The output unit 9 is able to be a group of eights independent outputs, for example, each commanding the engagement or disengagement of an element of a motor, valve, light indicator, etc., or equally be numerical information. In such case, the number of ciphers to be transmitted is not limited to two in the case of a bus of 8 bits. It is sufficient to operate in a manner that the output unit is at least a register containing two or more ciphers and is addressed consecutively many times. This permits directing numerical information of a number of ciphers to peripherals for attaching, imprinting and registering, etc.

The same consideration applies for entries which furnish numerical information formed by a specified number of ciphers, in groups of two if the bus has 8 bits.

It is also the same for information destined for the registers 11. These registers are able to register unitary information from 1 to 8 bits of the grid 2, or numerical data.

It is helpful to consider one or several registers 11, adressable bit by bit, through the grid 2, for separating identical situations of the entries. For the same state of entries, different decisions can be or are taken for the previously recounted situations.

A sequence of instructions is able to be presented, for example, in the following form:

| Address-Memory | Instruction | Grid | Address-Input | Output |
|---|---|---|---|---|
| 110 | 00000000 | 11111111 | 5 | 1 |
| 111 | 11111111 | 11111111 | 6 | 2 |
| 112 | 01000000 | 01100000 | 7 | 2 |
| 113 | 10000000 | 10000000 | 5 | 1 |
| 114 | 00000001 | 11000001 | 0 | 3 |
| | The sequence is able to signify in the command of the machine: | | | |
| 110 | IF all of the elements of a block of entries No. 5 = 0 | | | |
| 111 | AND that the counter 6 is at 255 | | | |
| 112 | AND that button No. 2 for a block of entries No. 7 is at 1, and button No. 3 attains zero | | | |
| 113 | OR that button No. 1 of a block of entries No. 5 equals 1 regardless of the other positions | | | |
| 114 | THEREFORE place the outputs 1 and 2 of block 3 at zero and the output 8 at 1. | | | |

The output is not given, therefore, if the following logic equation is satisfied, as indicated by the flag of equality 16: (110 AND 111 AND 112) OR (113)=1

It is seen that the address of output No. 1 demands a YES operation of the comparator 10, that of output No. 2 an AND operation, following which the address entry No. 0 opens the gate 7 to place the contents of instruction memory 1 on the data bus 6. This activates the output of block No. 3 according to the state of the grid 2.

It is to be noted that the instruction 1 and the grid 2 combine, bit by bit, in AND. The result permits engaging or disengaging an output, which is generally entered into memory.

The system accordingly presents a complete program of instructions to accomplish, among other things, the following:

Control the state of all or a part of the bits of a block from the output unit 8;
Control the state of the register 11;
Combine controls in the form of a sum of products;
Transfer an instruction in the memory 1 in the direction of an output unit 9 or a register 11;
Transfer an entry in the direction of an output unit 9 or a register 11;
Command a change in state of all or a part of the bits in a block at the output unit 9;
It is seen that the register 11 is able to function with inputs and outputs;
If arithmetic operations are desired, or if a large number of registers 11 is needed, or is time is to be taken into consideration for fixing the duration of an action, temporization, etc., it can be advantageous to decentralize a part of the programming using a register provided with "intelligence".

A non-limiting example is provided by a microprocessor 17 with a block of inputs and outputs, using a passive read-only-memory (ROM) and active random-access-memory (RAM) in which temporary registers are established. A program of instructions is able to do the following:

Controlling whether or not a register 11 is at zero;
Placing a register 11 at zero;
Transferring a number from register 11 following an input or an instruction from the memory 1;
Effect transfers amony the registers 11;
Counting, either incrementing or decrementing;
Counting or decrementing a frequency for fixing the duration, temporization, or measurement of an event;
Effectuating comparisons among registers 11 and furnishing the resultant in the form A=B,A>B,A<B;
Perform arithmentic operations.

For time advantage, numbers to be treated can be placed on the data bus 6 and instructions on the grid bus 12.

By decentralization of operations, a complete cycle of address generator 4 can be made of the memory 3 without any time loss, resulting a gain in speed of treatment.

By contrast, in the usual microprocessor or minicalculator, a change in the state of entries creates an interruption, demanding access to the central processor. The latter results in exclusive use of the central processor for that purpose.

A system according to the invention, on the other hand, is operable for separate courses of action during each memory addressing cycle. If the program contains, for example, 1000 instruction analyzed at a rate of 1 MHz, each instruction is tested 1000 times per second. This corresponds to a microsecond output and is a satisfactory comparison.

In the programming of the assemblage, the memories 1,2 and 3 can be completely inactive, but it is preferable to use programmable inactive memories (PROM) and erasable memories of the latter type (EPROM).

While it is possible to write the program in machine language as indicated above, it is preferable to use a development program. Transfers in the memories 1,2 and 3 show the need for clear instructions for the noninitiated.

A mnemonic vocabulary is created for designating the input units 8, the registers 11 and the output units 9. The instructions are intoduced in the form of logic equations such as:

$$AUT = 0 * FC = 1 * CTOP = 0$$

$$+ STP = 1$$

-continued

= MOT = 0 * LT3 = 1 which signifies: If the button AUT (automatic) is not activated AND the end of course indicator is activated FC1 AND the counter of operations CTOP is at zero OR the button STP (stop) is pressed THEN stop the motor and light the warning lamp No. 3.

The program assigns the entry and exit addresses for the memory 3 and creates instructions for memory 2 and grid signals for m memory 3. The program is also able to prepare the necessary data for transcription in the programmable inactive memory and eventually in the erasable inactive memory (PROM, EPROM).

Apparatus according to the invention presents the further advantage that it is non-sequential, with groups of instructions being introducible in random order. It is sufficient for a condition or a group of conditions to follow corresponding actions. Thus, each group of conditions-actions is able to be lodged without restriction in the memory. This is particularly used in adding elements, or eliminating them, without changing any of the rest of a program.

In effect, when the address generator 4 is restricted by the limiter 5 to a prescribed portion of the memories 1, 2 and 3, that can be modified, it is possible to stock several programs which provide, for example, different modes of functioning, program self-control, diagnostics in the case of malfunctioning, etc.

In case the invention is given a different scope, it suffices to reprogram the three memories 1, 2 and 3 without any modification of the components or circuits.

The term "grid" used in describing the invention is somewhat equivalent to the term "mask" used with microprocessors. A mask serves to exclude certain bits from being taken into account. In the present case the grid is equally able to apply to memory outputs, but it implies operations that are more complex than the simple AND operation of masking. In addition, the grid bus 12 can act as a vehicle for instructions that are destined for responsive peripherals, which involves more than simple masking. This is another reason for choosing the term "grid" in preference to the term "mask".

What is claimed is:

1. Programmable logic apparatus comprising
first memory means for storing only instruction signals; second memory means, separate from said first memory means, for storying only grid signals which permit said instruction signals to be taken partly or completely into account; third memory means, separate from said first memory means and said second memory means, for storing only pairs of address signals at each storage location of said third memory means;
means for addressing said first memory means, said second memory means and said third memory means cyclically and in synchronism for simultaneously extracting (1) a set of instruction signals, (2) a set of grid signals for partly or completely modifying said instruction signals and (3) a pair of different address signals; and means for comparing said instruction signals and said grid signals for determining if a prescribed condition is satisfied for the continuation of processing.

2. Apparatus in accordance with claim 1 further including
a first bus for applying an input to the comparing means, a register or an output unit, or for applying an instruction to said register or said output unit; a second bus for applying said grid signal to said comparator, said register or said output unit; and a third bus for transmitting said pair of different address signals to said output unit and to an input unit, respectively.

3. Apparatus in accordance with claim 1 further including
means, connected to the comparing means, for indicating if a succession of comparisons satisfies a logic equation of AND and OR operations presented in the form of a sum of products or a product of sums, to determine if a prescribed instruction provides valid inputs.

4. Apparatus in accordance with claim 2 further including
means, connected to said comparing means, for indicating if a succession of comparisons satisfies a logic equation of AND and OR operations presented in the form of a sum of products or a product of sums, to determine if a prescribed instruction provides valid inputs.

5. Apparatus in accordance with claim 1 further including a plurality of peripheral, decentralized units which are connected to be acted upon by the program stored in the first, second and third memories, or are connected to act independently of said program, to permit arithmetic and comparison operations without interfering with, or delaying, the execution of said program.

6. Apparatus in accordance with claim 2 further including
a plurality of peripheral, decentralized units which are connected to be acted upon by the program stored in the first, second and third memories, or are connected to act independently of said program, to permit arithmetic and comparison operations without interfering with, or delaying, the execution of said program.

7. Apparatus in accordance with claim 3 further including
a plurality of peripheral, decentralized units which are connected to be acted upon by the program stored in the first, second and third memories, or are connected to act independently of said program, to permit arithmetic and comparison operations without interfering with, or delaying, the execution of said program.

8. Apparatus in accordance with claim 1 further including
means, connected to the addressing means, for limiting the addressing of said first memory means, said second memory means, and said third memory means to a limited range between an initial address and a final address, to free the remaining portions of the memories for secondary and diagnostic programs.

9. Apparatus in accordance with claim 1 further including logic means for permitting the presentation of conditions and decisions in mnemonic form and translation into programmable instructions for the memory.

10. The method of operating logic apparatus which comprises the steps of:
(a) storing only instructions signals in a first memory;

(b) storing only grid signals, which permit said instructions signals to be taken partly or completely into account, in a second, separate memory;

(c) storing a pair of different address signals at each storage location in a third memory which is separate from said first memory and said second memory;

(d) addressing said first memory, said second memory and said third memory cyclically and in synchronism for simultaneously extracting (1) a set of instruction signals, (2) a set of grid signals for partly or completely modifying said instruction signals, and (3) a pair of different address signals; and (e) comparing at least said instruction signals and said grid signals for determining if a prescribed condition is satisfied for continuing the operation of said logic apparatus.

* * * * *